(12) United States Patent
Ibrahim et al.

(10) Patent No.: US 11,297,970 B2
(45) Date of Patent: Apr. 12, 2022

(54) SYSTEMS, DEVICES AND METHODS FOR GENERATING FRUIT JUICE

(71) Applicants: Rabei Ibrahim, Nazareth (IL); Salim Nimre, Nazareth (IL)

(72) Inventors: Rabei Ibrahim, Nazareth (IL); Salim Nimre, Nazareth (IL)

( * ) Notice: Subject to any disclaimer, the term of this patent is extended or adjusted under 35 U.S.C. 154(b) by 413 days.

(21) Appl. No.: 16/329,967

(22) PCT Filed: Sep. 1, 2017

(86) PCT No.: PCT/IL2017/050979
§ 371 (c)(1),
(2) Date: Mar. 1, 2019

(87) PCT Pub. No.: WO2018/042440
PCT Pub. Date: Mar. 8, 2018

(65) Prior Publication Data
US 2019/0200796 A1 Jul. 4, 2019

Related U.S. Application Data

(60) Provisional application No. 62/382,358, filed on Sep. 1, 2016.

(51) Int. Cl.
*A47J 19/02* (2006.01)
*A23N 1/00* (2006.01)
*A23N 1/02* (2006.01)

(52) U.S. Cl.
CPC .............. *A47J 19/02* (2013.01); *A23N 1/003* (2013.01); *A47J 19/023* (2018.08); *A23N 1/02* (2013.01)

(58) Field of Classification Search
CPC .. A23N 1/003; A23N 1/02; A23N 1/00; A47J 19/025; A47J 19/023; A47J 19/02
USPC .......................... 99/504, 501, 510, 515, 538
See application file for complete search history.

(56) References Cited

U.S. PATENT DOCUMENTS

| | | | | |
|---|---|---|---|---|
| 2,475,559 | A | * 7/1949 | Wilson | A47J 19/02 99/504 |
| 2,575,584 | A | 11/1951 | Cohen | |
| 2,901,013 | A | * 8/1959 | Freeman | A23N 4/14 269/22 |
| 3,866,528 | A | * 2/1975 | Montagroni | A23N 1/003 99/495 |
| 5,249,516 | A | * 10/1993 | Pastor | A23N 1/003 99/495 |
| 5,445,068 | A | 8/1995 | Michelson | |
| 5,544,572 | A | 8/1996 | Garmendia | |
| 5,957,043 | A | * 9/1999 | Font | A23N 1/003 99/502 |
| 9,493,298 | B2 * | 11/2016 | Evans | B30B 9/262 |
| 2008/0028943 | A1 | 2/2008 | Lee | |
| 2009/0162508 | A1 | 6/2009 | Davies | |
| 2015/0237910 | A1* | 8/2015 | Watanabe | A47J 19/027 99/510 |

* cited by examiner

*Primary Examiner* — Reginald Alexander
(74) *Attorney, Agent, or Firm* — Novick, Kim & Lee, PLLC; Jae Youn Kim

(57) ABSTRACT

The present invention relates to a novel citrus juicer.

12 Claims, 13 Drawing Sheets

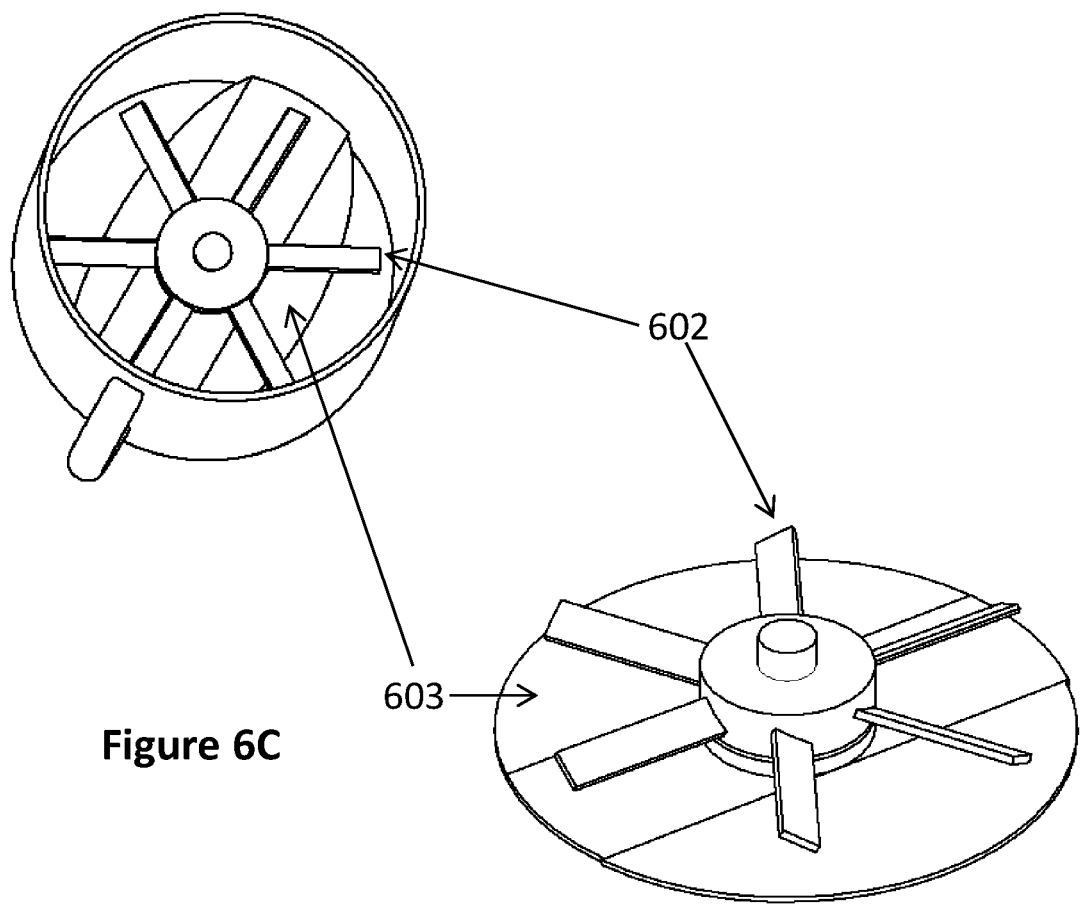
Figure 6C
Figure 6D
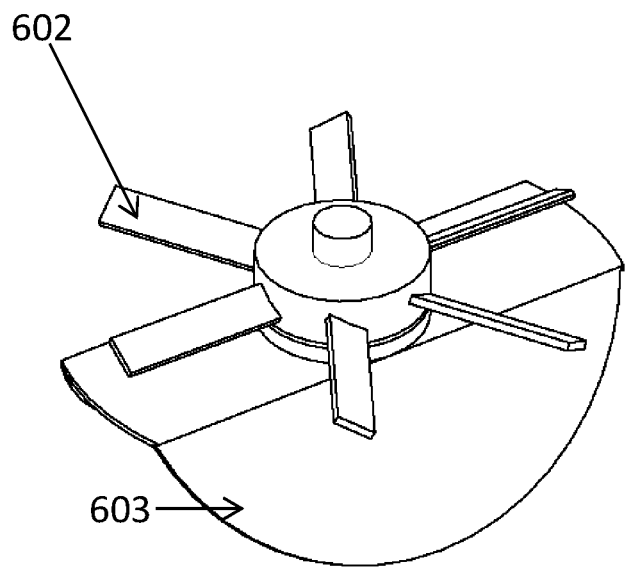
Figure 6E

SYSTEMS, DEVICES AND METHODS FOR GENERATING FRUIT JUICE

FIELD OF THE INVENTION

The present invention generally relates to devices, machines, systems and methods for generating fruit juice, and more particularly for generating juice from citrus fruits.

BACKGROUND OF THE INVENTION

Citrus fruits are a healthy and nutritional component in the diet. One favorite consumption manner of citrus fruits is by juicing them and drinking their juice. However, due to the inconvenience of manual juicing, many refrain from squeezing a fresh cup of juice and prefer to buy pre-juiced containers. Accordingly, many attempts were made to develop automatic citrus fruit juicers.

The first attempts were based on the simple manual squeezing procedure, which requires the user to first cut the citrus fruit and place it on a conic shape for squeezing. In standard squeezing devices, the squeezing is performed in one of the following manners: (i) by pressing the cut fruit onto a motorized conic shape while it spins; and (ii) by using a mechanical presser to enhance the pressure on the cut fruit and squeeze. After squeezing, the user needs to manually clear the citrus's peel and remaining fibers.

These manual squeezing procedures have many disadvantage, besides the tedious manual process that of creating the juice: (i) there is no control on the temperature of the citrus fruit; (ii) there is no option for remote squeezing (i.e. no smart operation); (iii) there is a need to apply hand force, which is limiting for, e.g., small children, elderly people, injured people, etc.; (iv) the parts has to be cleaned immediately in order to avoid blockage and clogging; (v) time consuming; (vi) usually there is no simple way to remove the pulp; and (vii) the squeezing efficiency is often not controlled and constant, and depends on the user's force.

In addition, several squeezing machines were developed in order to obviate the manual procedures, such as small machines for general fruit squeezing or larger commercial machines for citrus fruit squeezing. However, also these machines suffer from several disadvantage. For instance, the small squeezing machines need manual operation to add the fruits therein, and require the peeling of the citrus fruits prior to the squeezing. The larger commercial machines have their own disadvantages, such as high price tag; large size which does not fit regular household kitchens; the citrus fruits are kept at room temperature (not cooled); still requires manual cleaning daily; need to do clear the garbage daily; usually dedicated to squeeze a specific citrus fruit type; do not enable pulp separation; and lack of modularity, which force the user to use professional technical assistance at home upon any malfunction.

Accordingly, a need exists for a revolutionary citrus juicer, which overcomes all of the above disadvantages and others, while enabling simple and programmable juicing according to one's desire and schedule (e.g. remote activation or predefined time for juicing), that do not require constant and immediate cleaning procedures, and that enable easy maintenance.

SUMMARY OF THE INVENTION

The present invention provides a citrus juicer 100 comprising: (a) a citrus container 101; (b) a waste vessel 102; (c) at least one cooling unit coupled to said citrus container 101 and said waste vessel 102; (d) a citrus transportation system for delivering each citrus fruit from said citrus container 101 to the juicing point 204, said system comprises at least one of: (i) a conveyance unit 201, (ii) a stoppage/blocking unit 202, (iii) a pushing unit 203, and optionally, a citrus fruit rotation mechanism; (e) at least one scanning unit 104; (f) a digger 300 comprising: (i) a hollow cylindered body 302 having at least one opening 302', (ii) a drilling head 301 at said hollow cylindered body's tip, and (iii) grinding/cutting mechanism 303; (g) a computing system, comprising a processor and a memory, adapted to receive data from said scanning unit 104, and designed to analyze said data and instruct said digger 105 and said grinding/cutting mechanism 303 how to move within each citrus fruit; and (h) a pump 106 coupled to said digger 300; and (i) a self-cleaning system 400 comprising: (i) a water source 401, (ii) at least one sprinkler and/or vapor cleaning unit 402; and (iii) optionally a scrubbing unit, optionally comprising a cleaning container 403.

The present invention further provides a digger 300 unit for drilling into a citrus fruit and create juice therein, comprising: (i) a hollow cylindered body 302 having a proximal and distal end; (ii) at least one opening 302' at the proximal end of said hollow cylindered body 302; (iii) a drilling head 301 located at the tip of the proximal end of said hollow cylindered body; and (iv) grinding/cutting mechanism 303 for prying the flesh away from the peel, wherein said grinding/cutting mechanism 303 is secured alongside of said hollow cylindered body 302 (e.g. in designated grooves), and upon drilling and entering into the citrus fruit said grinding/cutting mechanism 303 spreads out to the inner walls of said citrus fruit and as the digger 300 spins, the fruit's flesh is prying away from its peel while generating juice within the fruit, which can then be drawn out via said hollow cylindered body 302.

BRIEF DESCRIPTION OF THE DRAWINGS

FIGS. 6A-6E illustrate a fruit and vegetable juicer unit and its components according to some embodiments of the invention.

DETAILED DESCRIPTION OF SOME EMBODIMENTS OF THE INVENTION

Figure 1A:
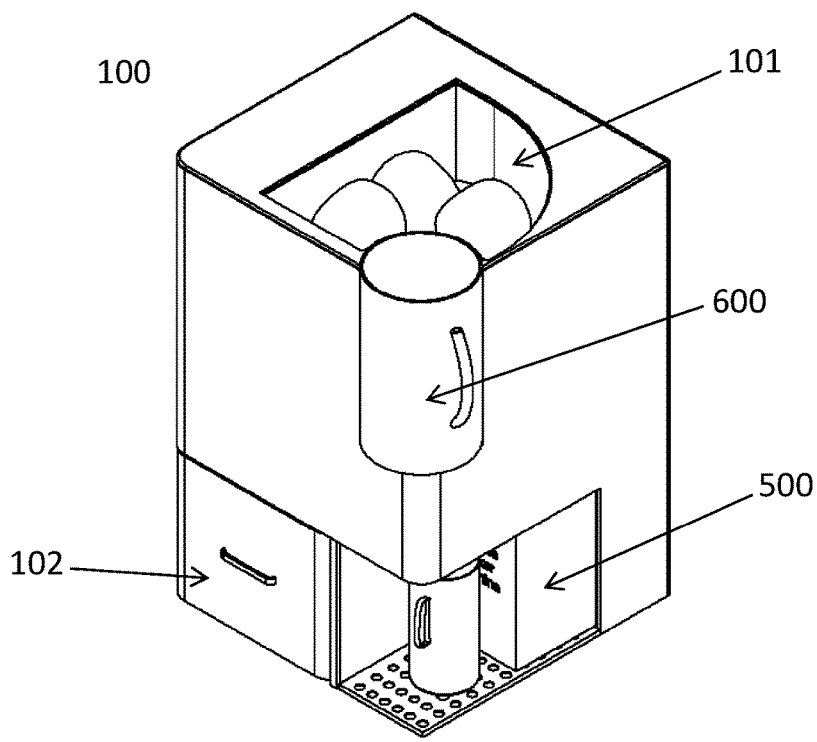
FIGS. 1A-1C illustrate a citrus juicer from three angles according to some embodiments of the invention.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention provides systems, devices, and methods for creating juice from various fruits and vegetables, especially citrus fruits. Accordingly, the present invention provides a citrus juicer 100, which does not squeeze the citrus fruits to generate the juice.

In certain embodiments, the present invention provides a citrus juicer 100 comprising: (a) a citrus container 101; (b) a waste vessel 102; (c) at least one cooling unit; (d) a citrus transportation system; (e) at least one scanning unit 104; (f) a digger 300; (g) a computing system; (h) a pump 106; and (i) a self-cleaning system 400.

In certain embodiments, said citrus container 101 is for holding/storing the citrus fruits before juiced, and is designed to hold any number of citrus fruits, e.g. up to 10, 15, 20 oranges or more, or any other equivalent amount of other citrus fruits.

In certain embodiments, said waste vessel 102 is for holding the peeling, pits, pulp, and any other debris and waste generated during the juicing procedure. In a specific embodiment, said waste vessel 102 is divided such that liquids are stored separately from the solid waste.

In certain embodiments, said at least one cooling unit is coupled to said citrus container 101 and said waste vessel 102 for both cooling the citrus fruits within said citrus container 101 prior to the juicing, thus enabling obtaining a cold juice upon juicing, as well as for keeping the collected waste within said waste vessel 102 chilled to thereby reduce waste-decomposition, thus minimizing the need for immediate emptying thereof.

In certain embodiments, said citrus transportation system is for delivering each citrus fruit from said citrus container 101 to the juicing point 204. In specific embodiments, said citrus transportation system comprises at least one of: (i) a conveyance unit 201, such as a moving strip, a vacuum or a simple tunnel which uses gravity, (ii) a blocking unit 202 for preventing an additional citrus fruit from entering the juicing point 204 while another fruit is being juiced, (iii) a pushing unit 203 for pushing the citrus fruit from its position at said citrus blocking/halting/stoppage unit 202 to the juicing point 204 after the previous citrus fruit has been juiced and discarded, and (iv) optionally, a rotation mechanism for rotating the citrus fruit into a upright position at the juicing point 204. In certain embodiments, said citrus transportation system is designed to place the citrus fruit to be juiced at the juicing point 204 in an up-right position. In another specific embodiment, said citrus transportation system comprises said conveyance unit 201, said stoppage/blocking unit 202 and said pushing unit 203. In another specific embodiment, said citrus transportation system comprises said conveyance unit 201, said stoppage/blocking unit 202, said pushing unit 203, and said rotation mechanism.

In certain embodiments, said at least one scanning unit 104 is for scanning the surface, shape and orientation of each citrus fruit placed at the juicing point 204, and optionally also for measuring the thickness of the citrus fruit's peel. In certain embodiments, said scanning unit 104 comprises any suitable scanner(s) and/or sensor(s), such as a laser sensor/scanner, a 2D laser sensor/scanner (e.g. OMRON 2D Smart Sensor), an ultrasound generating unit and a sensor therefor, etc.

In certain embodiments, said digger 300 is configured for drilling through the peel of each citrus fruit and further into the fruit, to create juice within the fruit while keeping the peel complete/whole. In a specific embodiment said digger 300 comprises: (i) a hollow cylindered body 302 having at least one opening 302'; (ii) a drilling head 301 at said hollow cylindered body's tip; and (iii) grinding/cutting mechanism 303 for prying the flesh away from the peel and generating juice within the boundaries of the citrus fruit's peel. In certain embodiments, said grinding/cutting mechanism 303 shifts from a closed position, i.e. attached to or embedded within dedicated grooves within said hollow cylindered body 302, and an open position, i.e. extended outwardly so that the grinding edges thereof can reach the inner surface of the peel once the digger 300 has passed the peel and entered into the citrus fruit. In another embodiment, said digger 300 rotates thereby enabling drilling through the fruit's peel, as well as turn said grinding/cutting mechanism 303 within said fruit to create the juice. In another embodiment, said grinding/cutting mechanism 303 or its tip(s) 304 also rotates on an axis so enhance and accelerate the juice making.

In certain embodiments, said computing system comprises a processor and a memory, adapted to receive data from said scanning unit 104, and designed to analyze said data and instruct said digger 105 and said grinding/cutting mechanism 303 how to move within each citrus fruit. In other embodiments, said computing system may receive input from a user regarding programmed operation, such that the citrus juicer 100 will start working at a predefined hour so that the user will have a fresh cup of juice ready when desired.

In other embodiments, the citrus juicer 100 further comprises at least one sensor for measuring different parameters, such as the number of fruits remaining in the citrus container 101, the amount of waste within the waste vessel 102, the temperature at the citrus container 101 and the waste vessel 102, the amount of juice generated, blockage of pipes and filters within said citrus juicer 100, etc.

In specific embodiments, said computing system is further adapted to receive data from said sensors, and designed to analyze said data and instruct the different components of said citrus juicer 100 how to operate. For instance, if the temperature rises, it can instruct the relevant cooling unit to begin working or to increase its activity; when the citrus container 101 is empty or when the waste vessel 102 is full, it can sound an alarm or send a notice to the user; when a filter or pipe is blocked it can facilitate reverse flow and/or other cleaning procedure, and/or can shut the operation and/or send a notice to the user with or without sounding an alarm. In other embodiments, said computing system receives data from any other component of the citrus juicer 100 and enables suitable activation thereof.

In certain embodiments, said pump 106 coupled to said digger 300 is for pulling/sucking the grinded citrus fruit flesh/juice from within the citrus fruit and into, e.g., a cup. In specific embodiments, said pump 106 is capable of reverse pumping, e.g. for cleaning purposes, e.g. to remove clogging of debris and pulp at a filter.

In certain embodiments, said self-cleaning system 400 is for cleaning the digger 300 and any other components of the citrus juicer 100 after juicing is complete. In certain embodiments, said self-cleaning system 400 comprises: (i) a water source 401, such as a water vessel or connection to running water source. In specific embodiments, said water source may comprise detergents or other cleaning substances, or may be fluidly connected to another container comprising them; (ii) at least one sprinkler and/or vapor cleaning unit 402; and optionally a scrubbing unit, optionally comprising a cleaning container 403, which is configured to contain or embrace, e.g. said digger 300 for cleaning.

In another specific embodiment, said computing system is adapted to operate said cleaning system 400, e.g. to identify when the juicing is complete, extend said vapor cleaning unit 402 and place said digger 300 within said cleaning container 403, and execute a cleaning procedure.

In certain embodiments, said computing system further comprises embedded software designed to perform all required monitoring and activation of the different components of the citrus juicer 100 of the invention. In a specific embodiment, the firmware of said software can be remotely updated.

In certain embodiments, the computing system of the citrus juicer 100 of the invention comprises a processor and a memory communicatively coupled to the processor comprising computing system-readable instructions that when executed by the processor cause the computing system to execute instructions adapted to manage and monitor the different components of said juicer 100.

In certain embodiments, the citrus juicer 100 of the invention and the computing system therewithin are coupled to a central server comprising a central management software designed to conduct deep learning analysis of the usage and behavior of all juicers 100 coupled thereto, for, e.g.: (1) performing predictive maintenance; and (2) preventing and minimizing cyber-attacks on said juicer 100. Accordingly, in another specific embodiment, all communication in- and out- of the citrus juicer 100 is encrypted.

In certain embodiments, upon activation of the citrus juicer 100 of the invention, a citrus fruit is delivered from said citrus container 101 through said citrus transportation system to said juicing point 204. There, after the citrus fruit is scanned by said scanning unit 104 and the size and shape of the fruit is determined, the digger 300 drills into the citrus fruit and separates the flesh from the peel while crushing and grinding the flesh to thereby create juice. The juice is then collected using a suction mechanism, i.e. using said pump 106. After the juicing is complete and all debris are removed into said waste vessel 102, the digger 300 and suction tubes are being cleaned using said self-cleaning system 400 and all waste water are moved to said waste container 102 or the sewage: the digger 300 is placed in front of said scrubbing unit, which extends towards it, and as clean water is sprayed thereon, the digger 300 turns and twists against said scrubbing unit thereby cleaning itself. Optionally, the digger 300 is placed or immersed into a cleaning container 403 and is cleaned by vapor mechanism. The dirty water is gathered either in said waste vessel 102 or drained into the sewer. In addition, the inner pipes within the citrus juicer 100 may be washed by passing water therethrough during the cleaning of said digger 300 (e.g. the water may be drawn via the pipes using said pump 106). In a specific embodiment, said cleaning is performed using soap for additional and thorough cleaning, wherein said soap may be placed within a dedicated soap container coupled to said cleaning unit 400. It should be noted that any type of soap may be used, such as an organic or regular soap.

In certain embodiments, the waste vessel 102 of the citrus juicer 100 of the invention is split into two containers-one for liquid and one for solid waste.

In specific embodiments, the citrus juicer 100 of the invention comprises two scanning units 104, wherein one is for scanning one side of the citrus fruit (i.e. its "front"), and the other for scanning its other side (i.e. its "back").

In a specific embodiment, said citrus juicer 100 of the invention comprises a citrus fruit rotation mechanism allowing the rotation of the citrus fruit at the juicing point 204 such that the fruit is positioned in the best angle for the digger 300 to enter and juice. In this configuration, said scanning unit(s) 104 is connected with said computing system and said rotation mechanism, such that the computing system receives data from said scanning unit(s) 104 and instruct said rotation mechanism how to turn the citrus fruit.

In specific embodiments, said rotation mechanism may be used, in addition to the turning of the citrus fruit to the optimum digging angle, also for turning the citrus fruit in the opposite direction of the turning of the digger 300, thus reducing juicing time.

In certain embodiments, the citrus juicer 100 of the invention further comprises a dedicated base at the juicing point 204, which holds the citrus fruit during juicing, and releases it into the waste vessel 102 after juicing is complete. In a specific embodiment, said dedicated base is part of or is said rotation mechanism.

In certain embodiments, the citrus juicer 100 of the invention further comprises any fruit and vegetable juicer unit 600 for creating juice from all kinds of fruit and vegetable. Said juicer unit 600 may be fluidly connected with said pump 106 or may be connected to a different pump or simply use gravitation or pouring of the generated juice to the serving vessel.

In specific embodiments, the citrus juicer 100 of the invention further comprises a special serving vessel or container for collecting the generated juice. In another specific embodiment, said cooling unit also cools said serving vessel of container so that the juice remains cold until served.

Figure 3A:
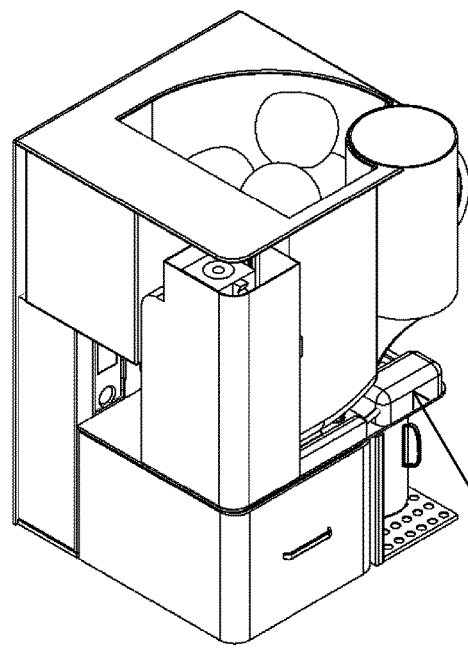
FIGS. 3A-3I illustrate a digger unit responsible for the generation of the juice according to some embodiments of the invention.
Figure 3B:
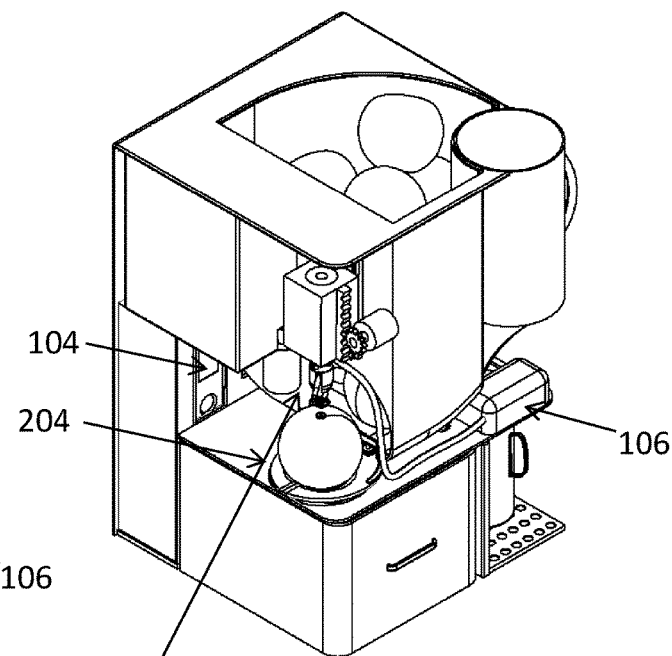
Figure 3C:
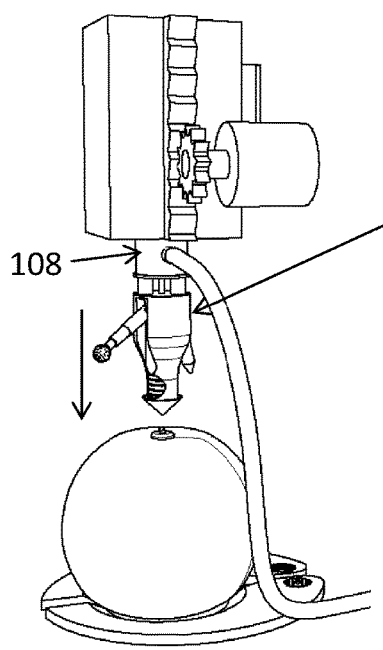
Figure 3D:
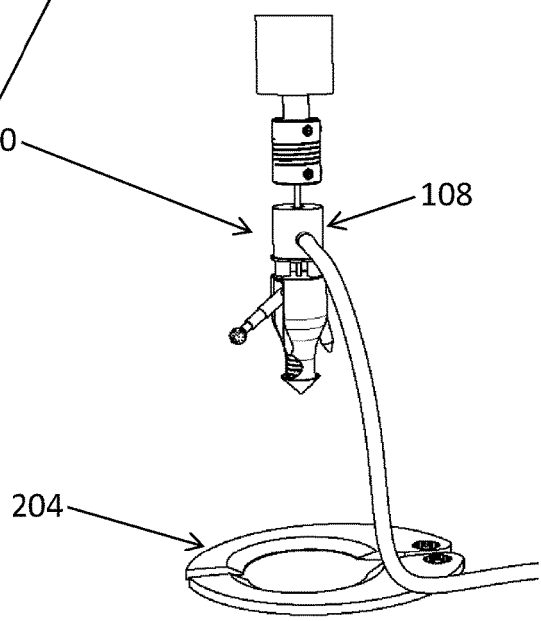
Figure 3E:
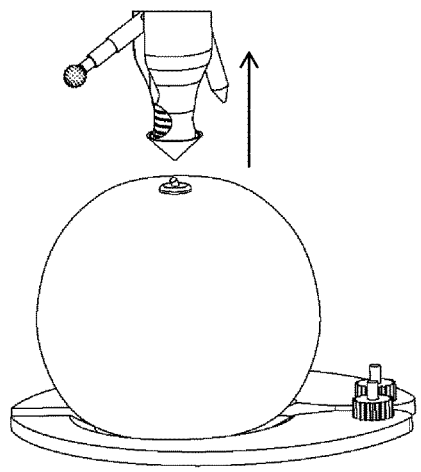
Figure 3F:
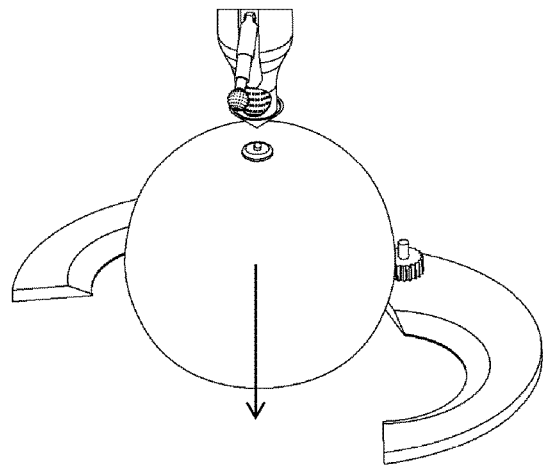

In certain embodiments, said hollow cylindered body 302 is divided to two separate independent chambers, each with its own opening, and said citrus juicer 100 further comprises an intermediate juice collection chamber 108 designed to allow the digger 300 to turn freely, which is coupled to said pump 106. Said intermediate juice collection chamber 108 is located between said pump 106 and said digger 300 (FIGS. 3C and 3D). In a specific embodiment, each opening of said independent chambers comprises a strainer (filter) of different sieve sizes, wherein one strainer is a rough sieve designed to prevent pits from passing, and the other strainer is a fine sieve designed to stop the passage of pulp and other small debris. According to this configuration, the user can instruct the citrus juicer 100 to generate juice with or without pulp, by merely determining through which independent chamber the juice will be pumped.

In other embodiments, said hollow cylindered body 302 comprises only a single chamber and at least one strainer, wherein said strainer can be moved to cover the opening to thereby prevent pulp from passing to thereby obtain pulp-free juice. According to this configuration, the user can instruct the citrus juicer 100 to generate juice with or without pulp, be merely shifting said strainer to enable or prevent pulp passage. In any case, there is a pits blocking sieve at the opening of said single chamber to prevent pits from entering the pipes directing the juice to the serving vessel.

In certain embodiments, the citrus juicer 100 further an independent juice and pulp separation unit located, e.g., between said digger 300 and said pump 106, or after said pump 106, for separating pulp from the juice according to desire. Such a separation unit may use centrifugal force and any other suitable technique to separate the pulp from the juice.

Figure 3G:
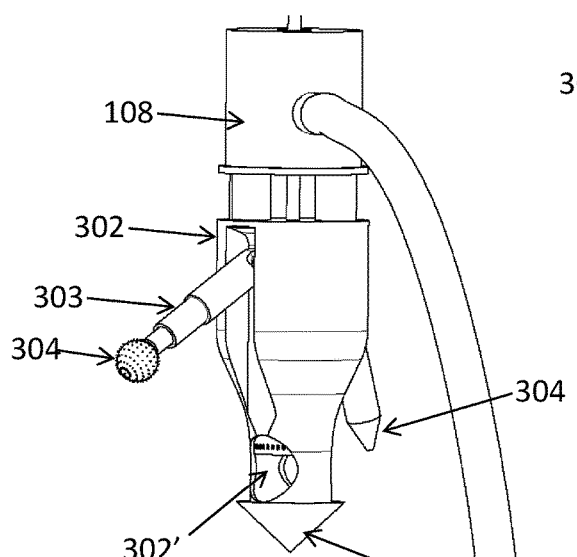

In another specific embodiment, the citrus juicer 100 further comprises a strainer clearing unit for removal of, e.g., pulp that accumulates thereon during juicing. Non-limiting examples of such clearing unit are: (i) a fixed viper mounted onto said digger 300 such that the opening(s) in the hollow chamber(s) in the rotating digger passes across said viper and is thus wiped clear; (ii) an active viper passing actively, constantly or periodically, across said opening(s) in the hollow chamber(s); and (iii) a reverse flow mechanism that pushes accumulated pulp away from the strainer. In a specific embodiment, as illustrated in FIGS. 3G and 3I, the sieve may be configured such that it can be moved across said opening 302' to thereby "scrub" any pulp and debris accumulated thereon, wherein the removal is carried out by the borders of said opening 302', which serves as said strainer clearing unit.

In certain embodiments, the citrus juicer 100 of the invention further comprises a power source. In a specific embodiment, said power source is rechargeable, thereby enabling the juicer 100 to be mobile.

In certain embodiments, said water source 401 is an integral water container. In another specific embodiment said water source 401 is a water tap providing fresh water whenever needed.

In certain embodiments, the citrus juicer 100 of the invention further comprises a waste compressing unit for reducing the size of the waste in the waste vessel 102, thus further reducing the need to empty it.

Figure 7A:
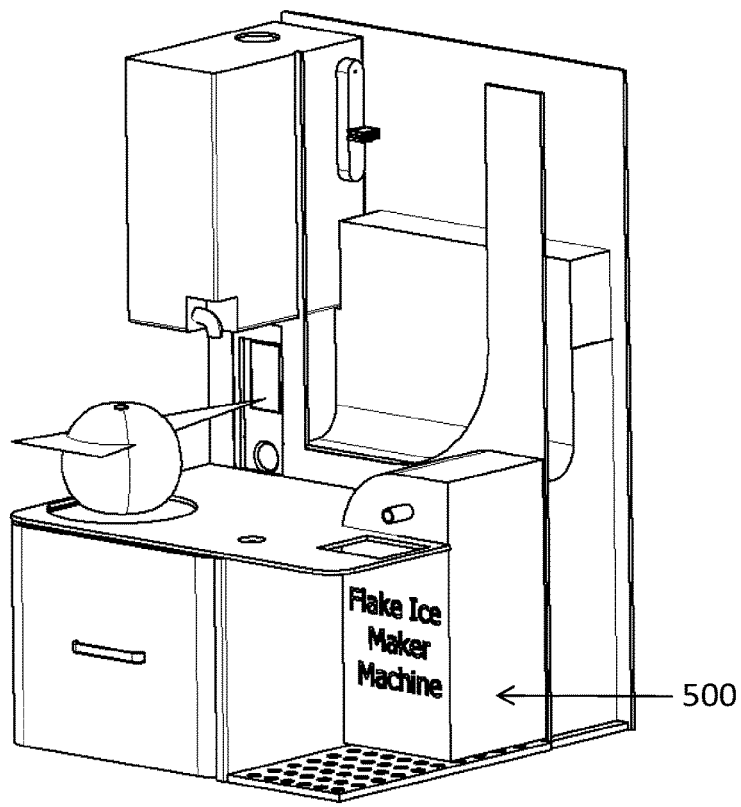
FIGS. 7A-7B illustrate a flake machine according to some embodiments of the invention.
Figure 7B:
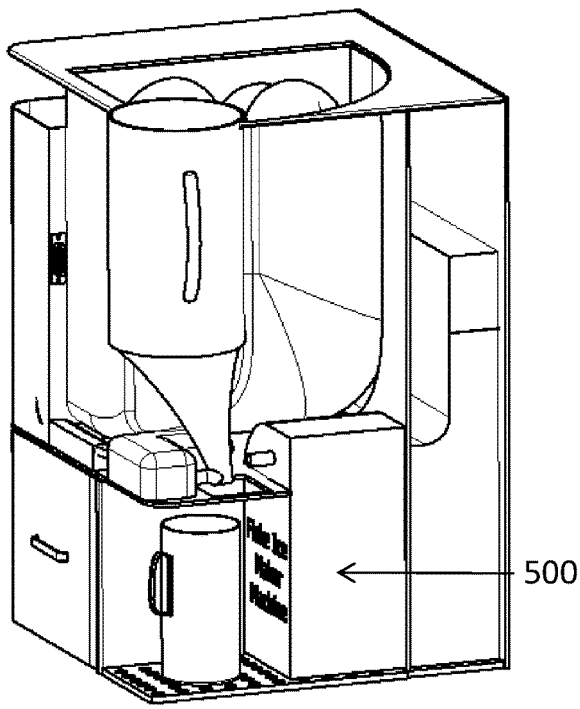

In specific embodiments, the citrus juicer 100 of the invention further comprises an ice flake machine 500 (see illustration thereof in FIG. 7), which creates immediately ice flakes that can be added optionally at different dozes to the generated juice based on user's choice. According to some embodiments, the principle of operation of such an ice flake machine/unit is as follows: connecting a water supply to the flake unit, cooling the water, e.g., through a stainless steel pipe, to a temperature of about 3-5° C., spraying the cooled water to a subcooled container to create ice, which is then crashed to create the ice flakes, and finally, an Archimedes transmission worm cylinder is used to release the volume of ice flakes to the juice container based on user decision. The icing principle is based on the refrigerating cycle of Andrew Muhl.

In certain embodiments, the citrus juicer 100 of the invention is modular, thus enabling easy parts replacement for, e.g., repair and/or improvements or modifications of the citrus juicer 100. This feature enables the end user to easily plug and unplug modular parts of the device/system, e.g. due to a malfunction, for maintenance and fixing thereof. In specific embodiments, the system is monitored worldwide, and follows malfunction reports and parts replacements, thereby enabling to anticipate when a certain part needs to be replaced before it actually fails, and optionally send the end user a new replacement part in advance as part of the service.

In certain embodiments, the citrus juicer 100 of the invention is made of any suitable material which is no-corrosive, such as plastic, polycarbonate, stainless steel, etc., or any combination thereof. For instance, the digger's blades may be made of stainless steel, and all other components from plastic.

In certain embodiments, the citrus juicer 100 of the invention is monitored by Internet of Things (IOT). All the data gathered by each citrus juicer 100 flows to a cloud for deep learning and, e.g., to estimate failure in advance. This feature enables prediction of failure, and subsequently shipment of in advance of relevant repair parts or modules to the user, thus providing smooth service and juice flow.

In certain embodiments, the citrus juicer 100 of the invention, further comprising self-monitoring sensors for measuring the performance of the different components of said juicer 100, and/or to allow deep learning, either on a remote server or within the computing system of the juicer, for predicting malfunction/failure in advance.

In certain embodiments, the present invention provides a digger 300 unit for drilling into a citrus fruit and create juice therein without squeezing or cutting the citrus fruit, said digger 300 comprises: (i) a hollow cylindered body 302 having a proximal and distal end; (ii) at least one opening 302' at the proximal end of said hollow cylindered body 302; (iii) a drilling head 301 located at the tip of the proximal end of said hollow cylindered body; and (iv) grinding/cutting mechanism 303 for prying the flesh away from the peel, wherein said grinding/cutting mechanism 303 is secured alongside of said hollow cylindered body 302 (e.g. in designated grooves), and upon drilling and entering into the citrus fruit said grinding/cutting mechanism 303 spreads out and/or extends to reach the inner walls of said citrus fruit, and as the digger 300 spins, the fruit's flesh is prying away from its peel while generating juice within the peel of the citrus fruit, which can then be drawn out via said hollow cylindered body 302 and pump 106. In specific embodiments, said grinding/cutting mechanism 303 spreads out using any suitable mechanism, such as a telescopic or folding arm, either hydraulic of pneumatic.

The size of the citrus juicer 100 of the invention is such that it can fit onto the kitchen countertop. However, the citrus juicer 100 can be manufactured in any shape and size according to need and desire. For instance, the citrus juicer 100 may be 0.3×0.3×0.5; 0.5×0.5×0.5; 1×1×1; 1.5×1.5×1.5; 0.5×1×1; 0.5×1×1.5; 1×1×1.5; 1×1.5×1.5 meters, or any other size. The thickness, width and height of the citrus juicer 100 may be the same of different and can be customized according to the user's needs.

It should be noted that the size and number of specific components of the citrus juicer 100 can be easily modified according to ones needs and desire. This is obtained due to the modularity of the citrus juicer 100.

Figure 1B:
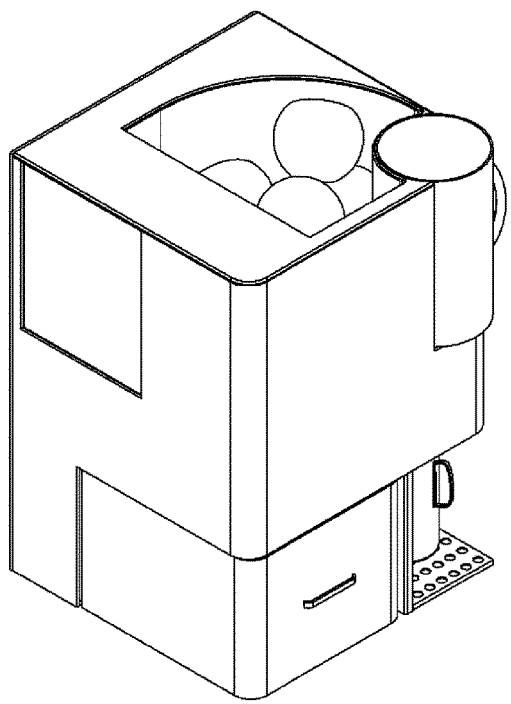
Figure 1C:
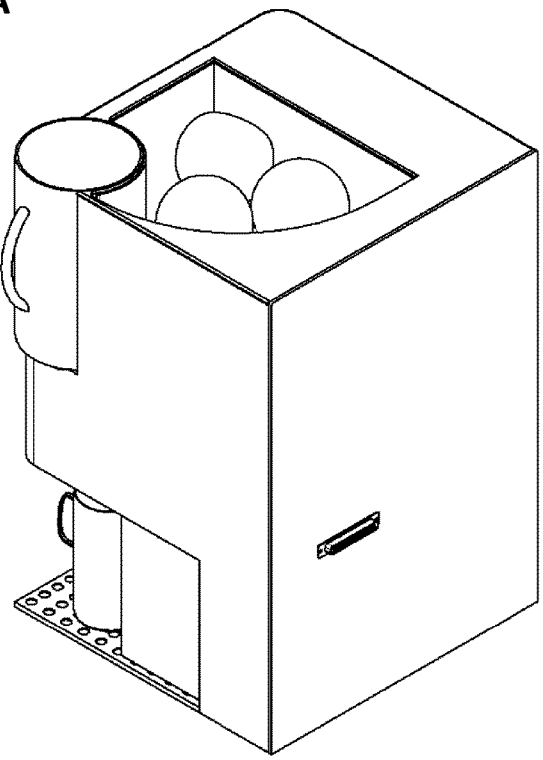

Reference is now made to FIGS. 1A-1C showing a citrus juicer 100 according to one embodiment of the invention in three different angles, while pointing at the main visible component thereof: the citrus container 101, waste vessel 102, and the optional flake machine 500 and fruit and vegetable juicer unit 600.

Figure 2A:
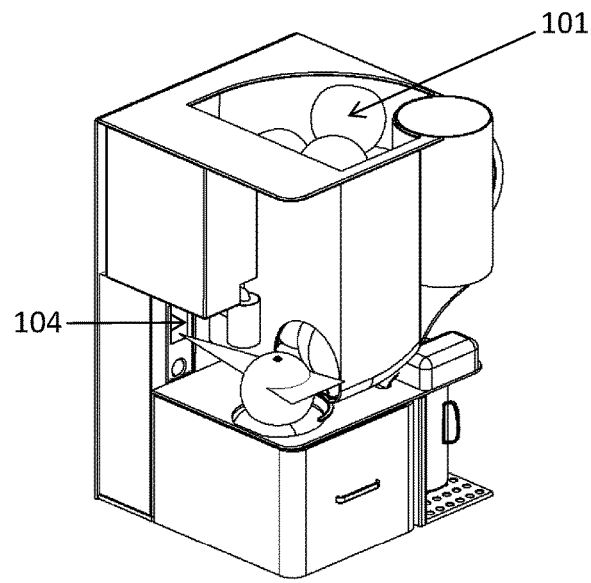
FIGS. 2A-2C illustrate a citrus container and the citrus transportation system according to some embodiments of the invention.
Figure 2B:
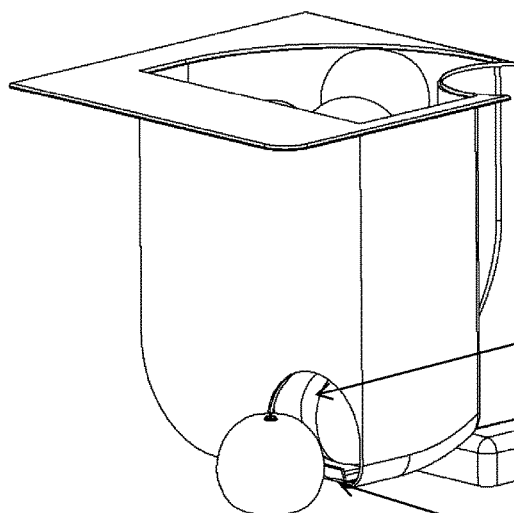
Figure 2C:
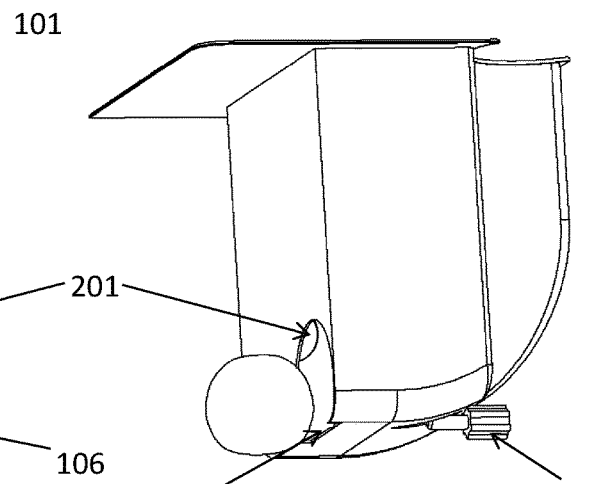

FIGS. 2A-2C provide an insight on the citrus container 101 and its different components, including the conveyance unit 201, stoppage/blocking unit 202, and pushing unit 203. The citrus container 101 is designed to hold citrus fruits in an amount sufficient for the preparation of at least one juice glass, i.e. about 250 cc juice. In specific embodiments, it can hold citrus fruits in an amount sufficient for the preparation of 500, 1000, or even 1500 cc juice.

Reference is now made to FIG. 3 illustrating the digger 300 of the invention: the digger 300 is located above the juicing point 204, such that when a citrus fruit is positioned thereon the digger 300 is lowered, drilling into it and penetrating it (FIG. 3C). The lowering of the digger 300 is carried out by any suitable mean, such as rails, cog-wheels, robotic arm, pneumatic or hydraulic mechanism, electric, etc. Once the juicing is complete, the digger 300 exits/extracted from the citrus fruit (FIG. 3E), which then drops into the waste vessel 102 (FIG. 3F).

Figure 3H:
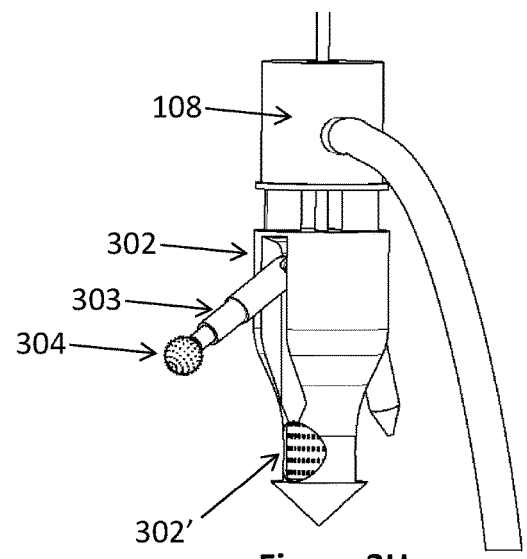
Figure 3I:
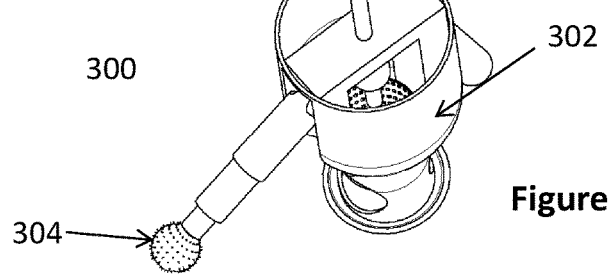

FIGS. 3G-3I illustrate one possible configuration of the digger 300 of the invention, showing the drilling head 301; the hollow cylindered body 302; the grinding/cutting mechanism 303 and one option of a rounded rough ball-shaped tip 304; and the opening 302' through which the juice is drawn-wither through a fine sieve (FIG. 3G) preventing passage of pulp, or through the opening when the sieve is lifted (FIG. 3H), thereby allowing pulp to pass through. Alternatively, the juice is drawn through said opening 302' either via a fine sieve that prevents pulp passage or via a wide sieve that allows pulp passage. FIG. 3I shows a digger 300 having a hollow cylindered body 302 with a single chamber, whereas FIGS. 3G and 3H show digger 300 having two separate independent chambers (evident by the two pipes connecting to the intermediate juice collection chamber 108.

Reference is now made to FIG. 4 illustrating the self-cleaning system 400 of the invention: the water source 401—either an integral container (FIGS. 4A-4D) or an external source (FIG. 4E); a vapor cleaning unit 402 coupled to said water source 401 and having a cleaning container 403 at its tip, into which said digger 300 is inserted for cleaning. In another configuration, the cleaning system 400 does not comprise such a cleaning container 403 and the digger 300 is cleaned by direct vapors or water sprayed thereon as it turns, optionally against a scrubbing unit which is present instead of said cleaning container 403. In another embodiment, the citrus juicer 100 further comprises an additional soap container for supplying soap to the cleaning water. The water used for cleaning may also be drawn by the pump 106 in order to clean the pipes and inner components of the citrus juicer 100 after juicing. In a specific embodiment, the pump 106 is connected directly to the water source 401 thus pumping clean water through the system, optionally with soap. The water used for washing is discarded, either into the waste vessel 102, to the sewage, and/or to a collecting vessel located instead of the juice collecting vessel (for collecting water passing through the inner pipes).

Figure 4A:
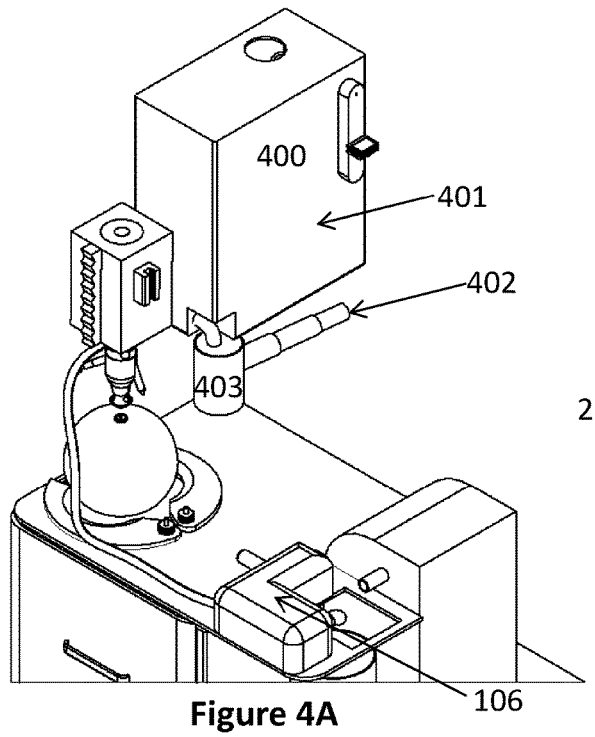
FIGS. 4A-4E illustrate possible configurations of the self-cleaning system according to some embodiments of the invention—with an integral water container (FIGS. 4A-4D) or with an exterior water source (FIG. 4E).
Figure 4B:
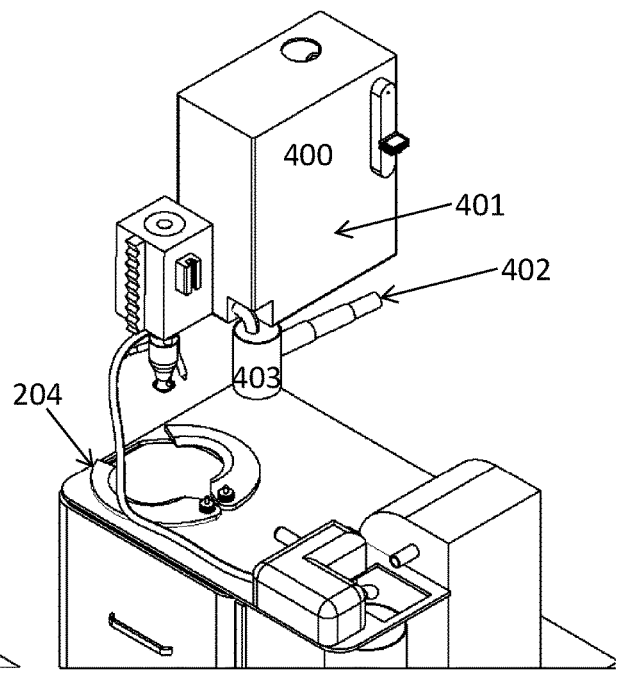
Figure 4C:
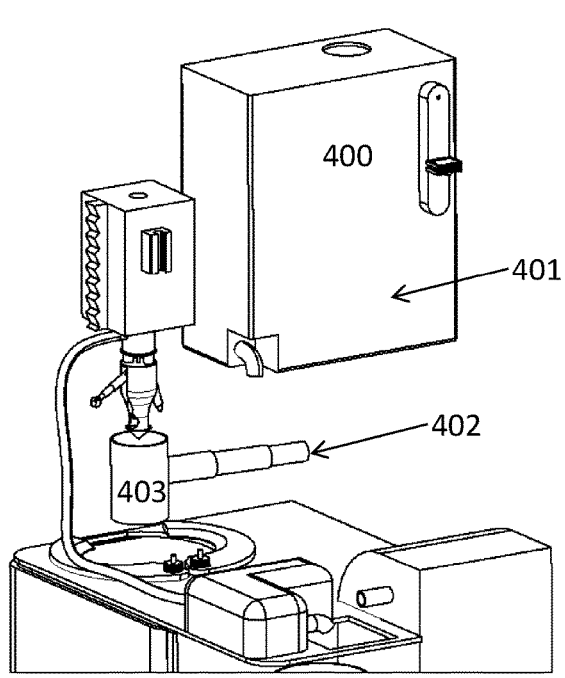
Figure 4D:
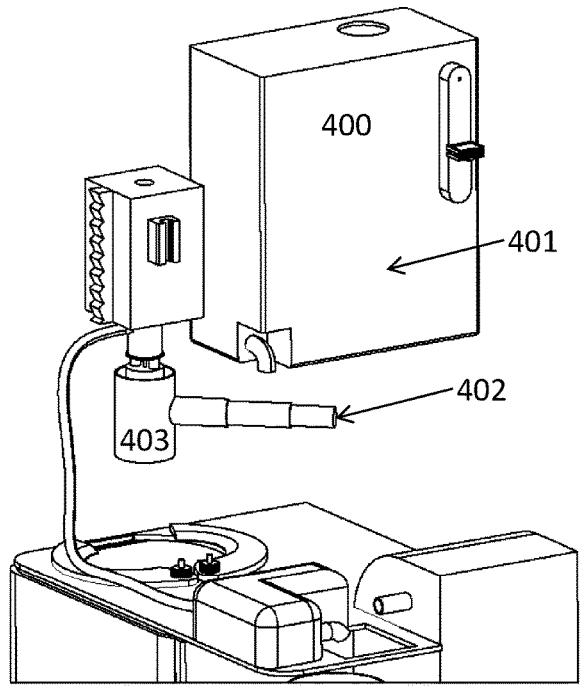
Figure 4E:
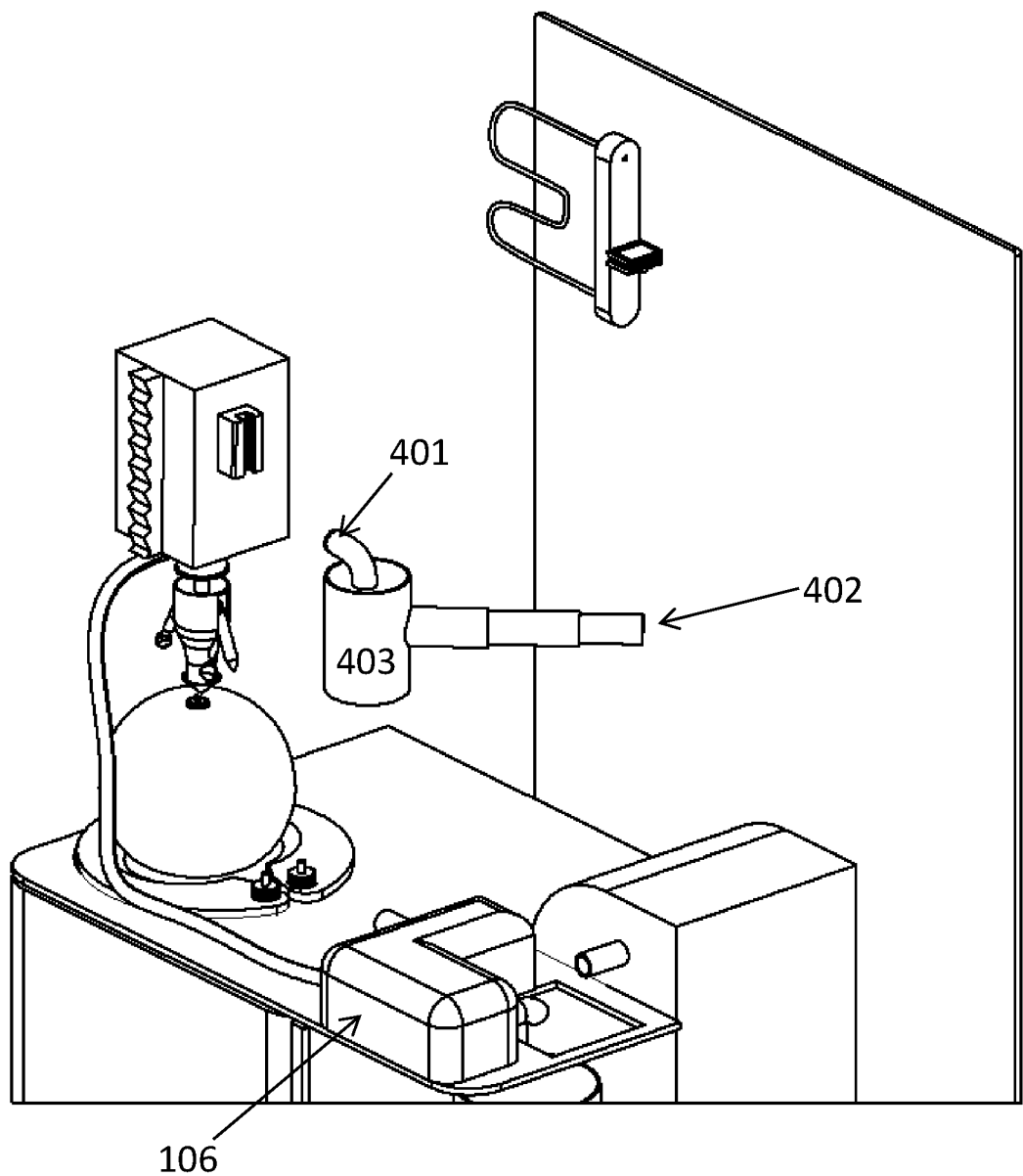
Figure 5A:
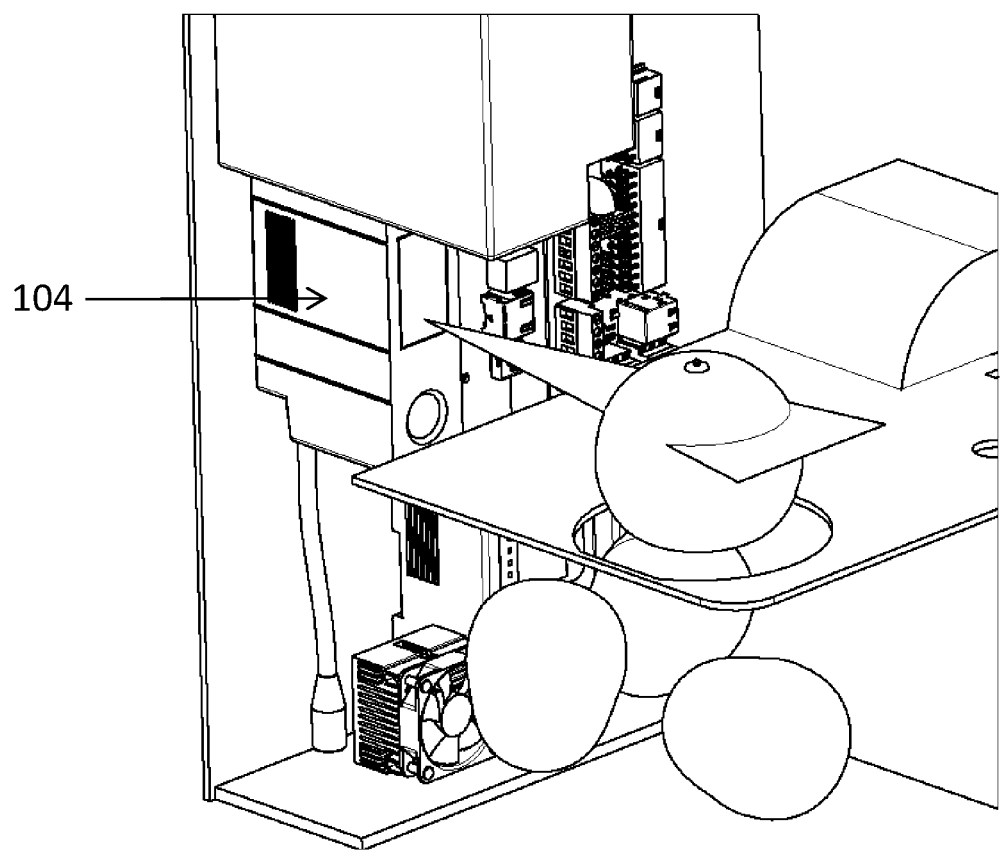
FIGS. 5A-5E illustrate a waste container according to some embodiments of the invention.
Figure 5B:
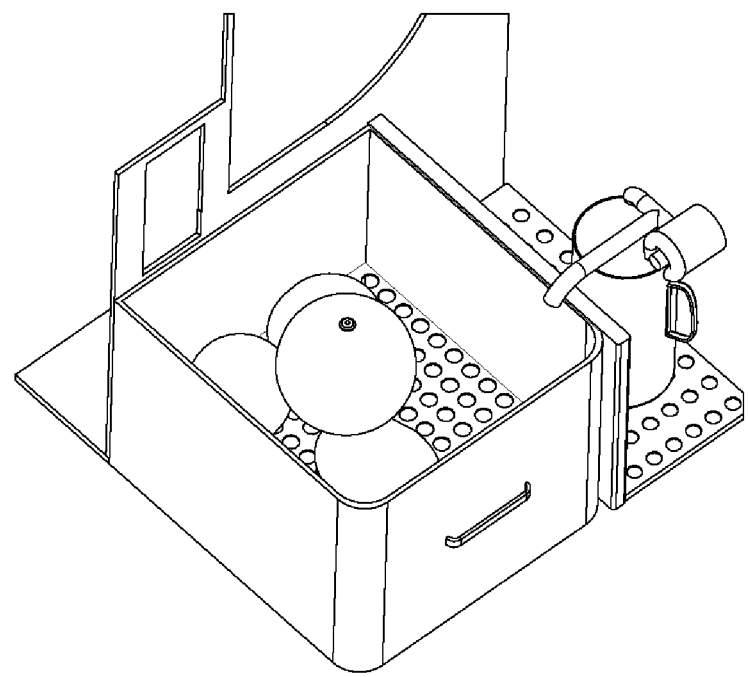
Figure 5C:
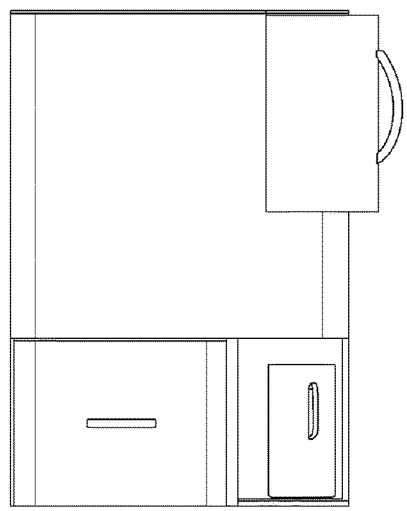
Figure 5D:
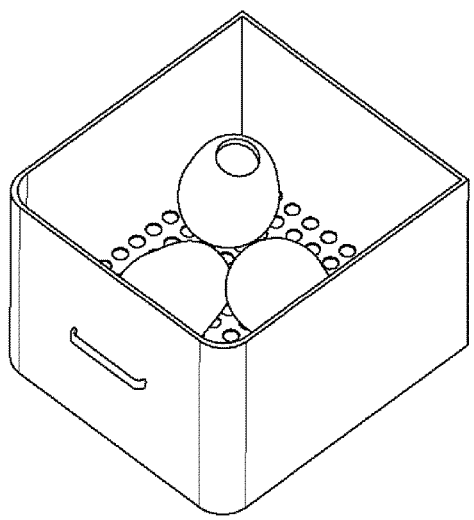
Figure 5E:
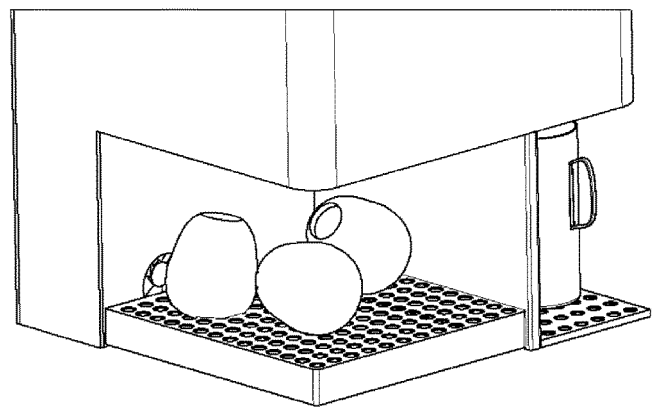

As illustrated in FIGS. 4A-4D, after the juicing is complete, the digger 300 is extracted from the citrus fruit (FIG. 4A), and the citrus fruit is discarded (FIG. 4B). Then, the vapor cleaning unit 402 is positioned underneath the digger 300 (FIG. 4C), which is then lowered and immersed in said cleaning container 403 (FIG. 4D). After cleaning is complete, the digger 300 is extracted from said cleaning container 403, and the cleaning unit 402 is returned to its original place.

The waste compartment 102 may be a simple single compartment holding both liquid and solid waste. Alternatively, it may be comprised of two separate compartments-one for solid waste and the other for liquids. Reference is now made to FIG. 5 illustrating two possible configurations of a two-compartment waste container 102: one in which the two compartments of the container are parallel (FIG. 5B); and the other in which the liquid waste compartment is beneath the solid waste compartment (FIGS. 5C-5E), separated by a mesh that allows the liquid to pass. The size of the two separate compartments may be the same or different, and, optionally, it may be modified by moving the separating wall/mesh in between. As noted above, the citrus juicer 100 may also comprise a waste compressing unit, which might be part of, or coupled to, said waste container 102.

Figure 6A:
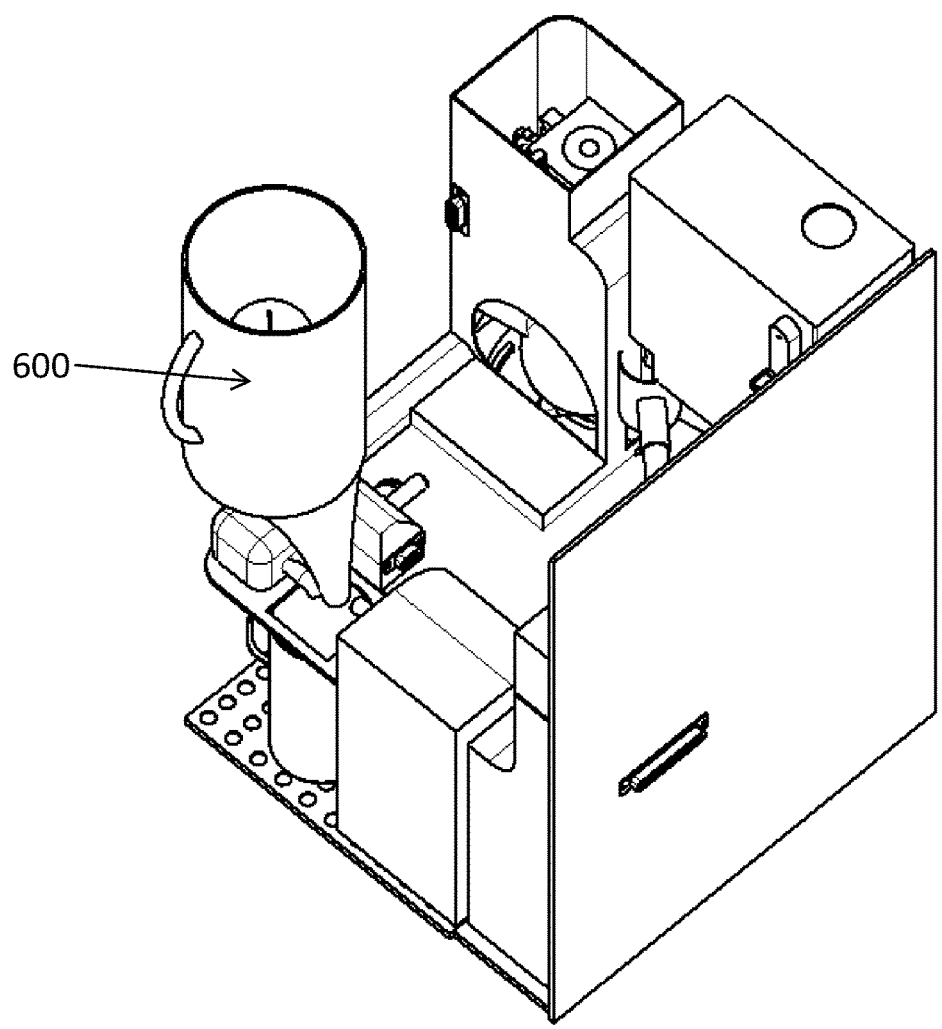
Figure 6B:
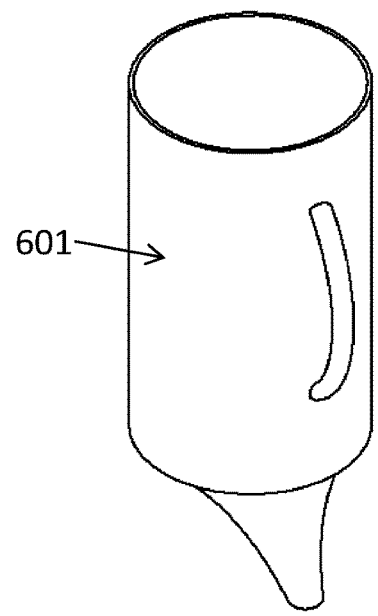

Reference is now made to FIG. 6 illustrating the fruit and vegetable juicing unit 600 according to some embodiments of the invention. This unit 600 is configured to juice any type of fruit and vegetable, and it comprises a container 601; a blade 602 and optional flaps 603 for decanting the generated juice to the juice collecting vessel located underneath it. Once fruits or vegetables are placed within said unit 600, the blades twist quickly and mash said fruits or vegetables, thus creating juice therefrom. Then, the flaps 603 are opened allowing the juice to flow down into the juice collecting vessel located below it. Alternatively, once juicing is complete, the unit 600 is detached from the citrus juicer 100 thus enabling pouring the juice. In another configuration, the unit 600 is connected to the same or another pump 106, which draws the juice into the juice collecting vessel. In an alternative embodiment, the juice flows into the receiving vessel by means of gravity.

Figure 8A:
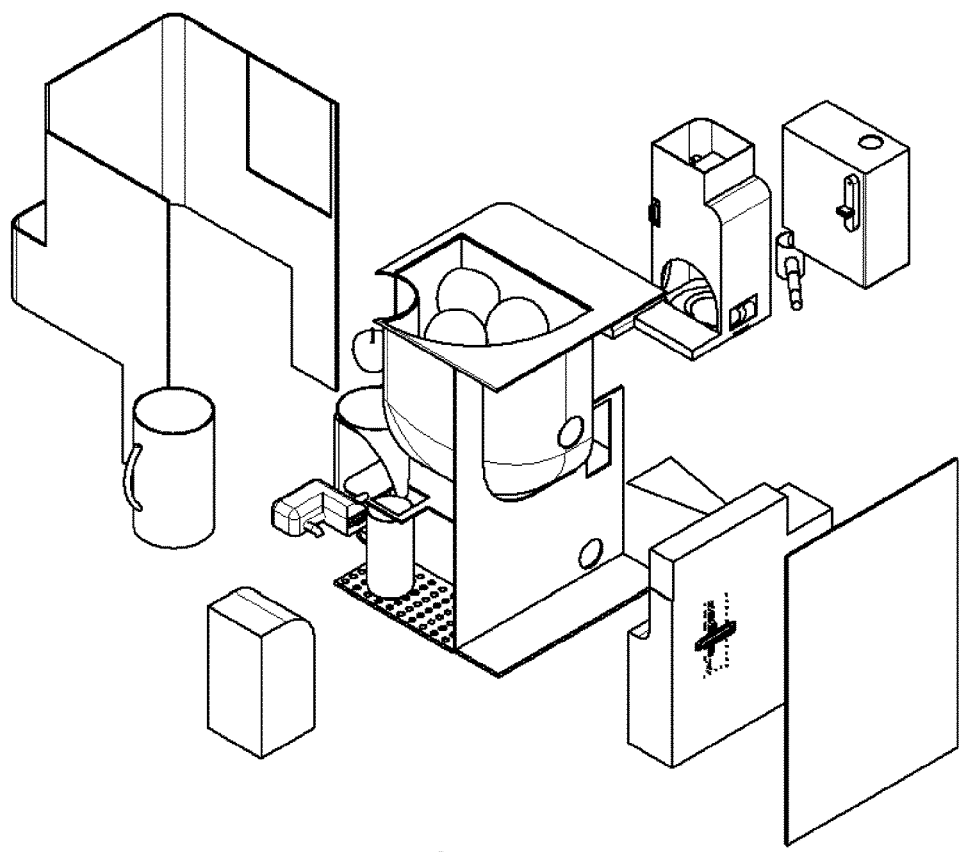
FIGS. 8A-8C illustrate an exploded view of the juicer according to a specific embodiment of the invention.
Figure 8B:
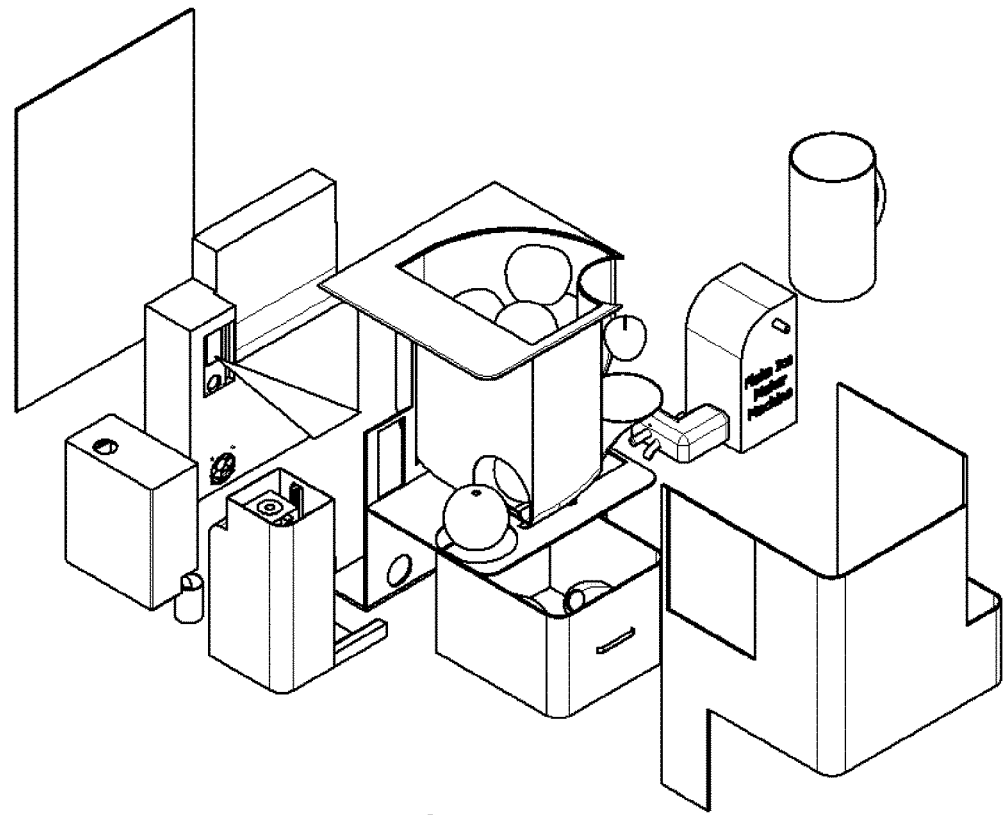
Figure 8C:
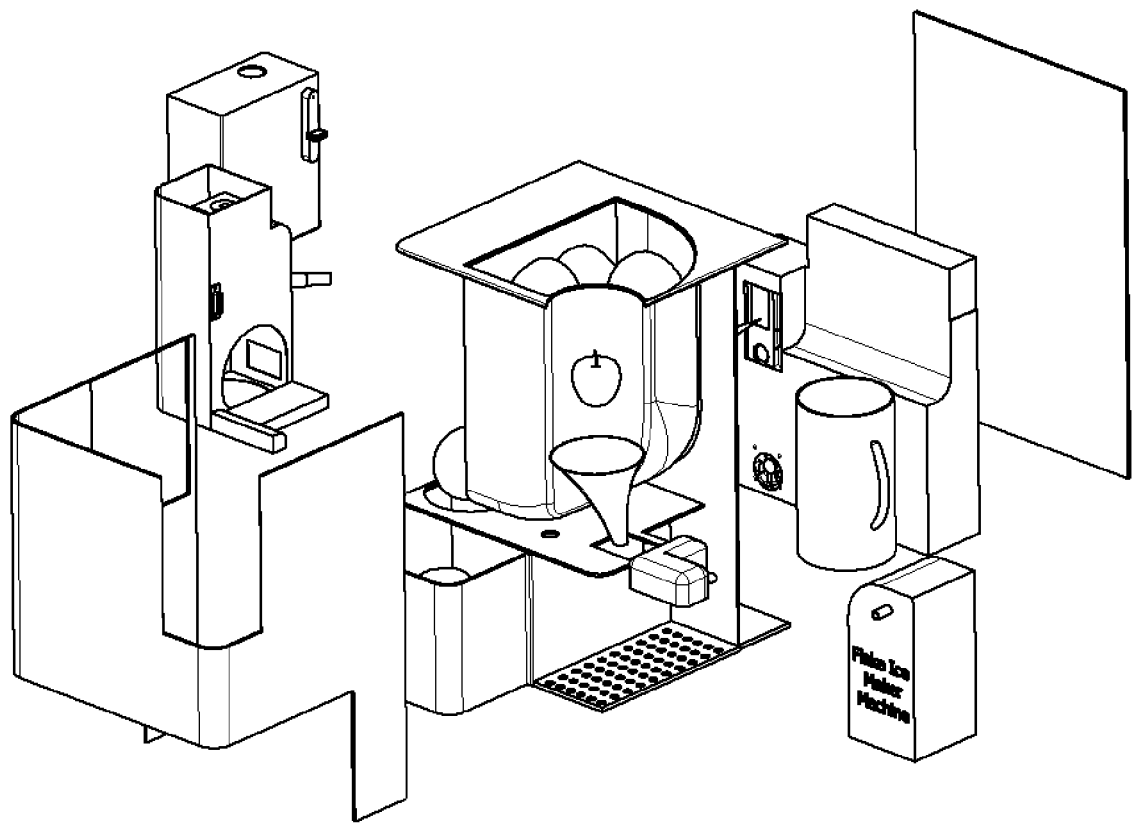

Reference is now made to FIG. 8 illustrating the modality of the juicer 100 of the invention. As seen in the figures, the juicer 100 can be easily disassembled, e.g. for repair, part(S) replacement, or for personal modification according to end-user's need and desire.

In certain embodiments, the present invention provides a citrus juicer comprising: (a) a citrus container; (b) a waste vessel; (c) at least one cooling unit coupled to said citrus container and said waste vessel; (d) a citrus transportation system for delivering each citrus fruit from said citrus container to the juicing point, said system comprises at least one of: a conveyance unit, a stoppage unit, optionally a pushing unit, and optionally, a citrus fruit rotation mechanism; (e) at least one scanning unit; (f) a squeezing/pressing mechanism adapted to squeeze each citrus fruit to generate juice; (g) a computing system, comprising a processor and a memory, adapted to receive data from said scanning unit; and (h) a self-cleaning system comprising: a water source, at least one sprinkler and/or vapor cleaning unit; and optionally a scrubbing unit, optionally comprising a cleaning container.

In specific embodiments, the above citrus juicer further comprises at least on of: (1) a digger unit comprising: a hollow cylindered body having at least one opening, and a drilling head at said hollow cylindered body's tip, wherein said computing system is further designed to instruct said digger how to drill into each citrus fruit, prior to its squeezing, such that the juice resulting from the squeezing of the fruit exits the fruit from the hole drilled in said fruit; and (2) a fruit cutting mechanism, wherein said computing system is further designed to instruct said cutting mechanism how to move and cut each citrus fruit, prior to its squeezing.

In further specific embodiments of the citrus juicer of the invention, the squeezing/pressing mechanism comprises two opposing side walls pressed against a citrus fruit.

In certain embodiments, the pressing of the two opposing side walls is carried out by an electric engine and a screw mechanism; a piston that is electric, pneumatic or hydraulic; or any other suitable mechanism for pressing.

In specific embodiments, the pressing of the fruit is carried out only after identification that the fruit is in place and in the proper orientation, i.e. by the aid of said citrus transportation system and said scanning unit.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed above even when not initially claimed or mentioned in such combinations. A teaching that two elements are combined is further to be understood as also allowing for a combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A citrus juicer comprising:
   a) a citrus container;
   b) a waste vessel;
   c) at least one cooling unit coupled with said citrus container and said waste vessel;
   d) a citrus transportation system for delivering a citrus fruit from said citrus container to a juicing point, said transportation system comprising at least one of:
      a conveyance unit,
      a stoppage unit,
      a pushing unit, and
      a citrus fruit rotation mechanism;
   e) at least one scanning unit;
   f) a digger comprising:
      a hollow cylindrical body having at least one opening and a tip,
      a drilling head disposed at the tip of the hollow cylindrical body, and
      a grinding/cutting mechanism;
   g) a computing system comprising a processor and a memory, adapted to receive data from said scanning unit, and further adapted for analyzing said data and instructing said digger and said grinding/cutting mechanism how to move within the citrus fruit; and
   h) a pump coupled to said digger; and
   i) a self-cleaning system comprising:
      a water source; and
      at least one sprinkler and/or vapor cleaning unit,
   wherein: (i) said hollow cylindrical body comprises two separate independent chambers, each having an opening, and said citrus juicer further comprises an intermediate juice collection chamber, which is coupled to said pump; or (ii) said hollow cylindrical body comprises only a single chamber having an opening, and wherein each opening of said chambers comprises a strainer.

2. The citrus juicer of claim 1, wherein said waste vessel is split into two containers—one for liquid and another for solid waste.

3. The citrus juicer of claim 1, comprising two scanning units, one for scanning one side of the fruit, and another for scanning another side.

4. The citrus juicer of claim 1 further comprising a fruit and vegetable juicer unit.

5. The citrus juicer of claim 1, wherein said hollow cylindered body comprises two separate independent chambers, each having an opening, each opening of said independent chambers comprises a strainer having different sieve sizes.

6. The citrus juicer of claim 5 further comprising a strainer clearing unit.

7. The citrus juicer of claim 1 further comprising a power source.

8. The citrus juicer of claim 1, wherein said water source is an integral water container.

9. The citrus juicer of claim 1, wherein said citrus juicer is modular, thus enabling parts replacement for repair or modifications of the citrus juicer.

10. The citrus juicer of claim 1, wherein said memory is communicatively coupled to the processor and includes computer-readable instructions that when executed by the processor cause the computing system to execute the instructions adapted to manage and monitor components of said juicer.

11. The citrus juicer of claim 1, further comprising self-monitoring sensors.

12. A digger unit for drilling into a citrus fruit having a flesh and a peel and creating a juice therein, comprising:
   a hollow cylindrical body having a proximal and distal end;
   at least one opening disposed at the proximal end of said hollow cylindrical body;
   a drilling head located at a tip of the proximal end of said hollow cylindrical body; and
   a grinding/cutting mechanism for prying the flesh away from the peel,
   wherein said grinding/cutting mechanism is secured alongside of said hollow cylindered body, and upon drilling and entering into the citrus fruit said grinding/cutting mechanism spreads out to inner walls of said citrus fruit and as the digger spins, the flesh is prying away from the peel while generating the juice within the fruit, which can then be drawn out via said hollow cylindered body, and
   wherein: (i) said hollow cylindrical body comprises two separate independent chambers, each having an opening, and said citrus juicer further comprises an intermediate juice collection chamber, which is coupled to said pump; or (ii) said hollow cylindrical body comprises only a single chamber having an opening, and wherein each opening of said chambers comprises a strainer.

* * * * *